United States Patent
Chae et al.

(10) Patent No.: US 9,894,688 B2
(45) Date of Patent: Feb. 13, 2018

(54) METHOD AND APPARATUS FOR TRANSMITTING/RECEIVING SIGNAL RELATED TO DEVICE-TO-DEVICE COMMUNICATION IN WIRELESS COMMUNICATION SYSTEM

(71) Applicant: LG ELECTRONICS INC., Seoul (KR)

(72) Inventors: Hyukjin Chae, Seoul (KR); Seungmin Lee, Seoul (KR); Hakseong Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/771,461

(22) PCT Filed: Mar. 6, 2014

(86) PCT No.: PCT/KR2014/001836
§ 371 (c)(1),
(2) Date: Aug. 28, 2015

(87) PCT Pub. No.: WO2014/137170
PCT Pub. Date: Sep. 12, 2014

(65) Prior Publication Data
US 2016/0007383 A1     Jan. 7, 2016

Related U.S. Application Data (60) Provisional application No. 61/773,836, filed on Mar. 7, 2013, provisional application No. 61/944,583, filed on Feb. 26, 2014.

(51) Int. Cl.
H04M 11/04     (2006.01)
H04W 76/00     (2018.01)
(Continued)

(52) U.S. Cl.
CPC ........... H04W 76/007 (2013.01); H04W 4/22 (2013.01); H04W 8/005 (2013.01);
(Continued)

(58) Field of Classification Search
CPC ....................................................... H04W 4/22
(Continued)

(56) References Cited

U.S. PATENT DOCUMENTS

2007/0115884 A1\* 5/2007 Shang ................... H04W 36/30
370/331
2011/0243066 A1\* 10/2011 Nayeb Nazar .......... H04L 1/007
370/328

(Continued)

FOREIGN PATENT DOCUMENTS

CN     102792759 A     11/2012
EP     2688226 A2     1/2014
(Continued)

OTHER PUBLICATIONS

Alcatel-Lucent et al., "LTE device to device evaluation methodology," 3GPP TSG-RAN1 Meeting #72, Jan. 28-Feb. 1, 2013, 8 pages, R1-130469.

(Continued)

*Primary Examiner* — Fabricio R Murillo Garcia
(74) *Attorney, Agent, or Firm* — Birch, Stewart, Kolasch & Birch, LLP (57) ABSTRACT

Embodiments of the present invention relate to a method for transmitting/receiving a signal related to a device-to-device (D2D) communication by a first user equipment in a wireless communication system. The method comprises the steps of: stopping uplink transmission in a first band for a predetermined time interval and searching for a signal transmitted by a second user equipment; and transmitting a report to a third user equipment when the signal transmitted by the (Continued)

second user equipment is found, wherein the report contains the existence of the second user equipment and information related to a band in which the signal from the second user equipment is received.

14 Claims, 7 Drawing Sheets

(51) Int. Cl.
  *H04W 76/02* (2009.01)
  *H04W 8/00* (2009.01)
  *H04W 4/22* (2009.01)
  *H04W 68/00* (2009.01)
  *H04W 72/12* (2009.01)
  *H04W 84/18* (2009.01)

(52) U.S. Cl.
  CPC ....... *H04W 68/005* (2013.01); *H04W 72/121* (2013.01); *H04W 76/023* (2013.01); *H04W 84/18* (2013.01)

(58) Field of Classification Search
  USPC ...................................................... 455/404.1
  See application file for complete search history.

(56) References Cited

U.S. PATENT DOCUMENTS

| | | | |
|---|---|---|---|
| 2012/0052795 A1* | 3/2012 | Shen | H04B 7/15585 455/7 |
| 2013/0194931 A1* | 8/2013 | Lee | H04L 5/0053 370/241 |
| 2013/0272157 A1* | 10/2013 | Gao | H04W 52/146 370/252 |
| 2013/0273907 A1* | 10/2013 | Vikberg | H04W 48/02 455/426.1 |
| 2014/0064203 A1 | 3/2014 | Seo et al. | |
| 2016/0029379 A1* | 1/2016 | Kuchibhotla | H04W 76/023 370/329 |

FOREIGN PATENT DOCUMENTS

| WO | WO 2008/020236 A1 | 2/2008 |
|---|---|---|
| WO | WO 2012/128505 A2 | 9/2012 |
| WO | WO 2013/013412 A1 | 1/2013 |

OTHER PUBLICATIONS

Interdigital, "Recommendations for D2D evaluation methodology and assumptions," 3GPP TSG-RAN WG1 Meeting #72, Jan. 28-Feb. 1, 2013, 6 pages, R1-130236.

LG Electronics, "Considerations for D2D Proximity Services Evaluation," 3GPP TSG RAN WG1 Meeting #72, Jan. 28-Feb. 1, 2013, pp. 1-6 (7 pages total), R1-130217.

* cited by examiner

METHOD AND APPARATUS FOR TRANSMITTING/RECEIVING SIGNAL RELATED TO DEVICE-TO-DEVICE COMMUNICATION IN WIRELESS COMMUNICATION SYSTEM

CROSS REFERENCE TO RELATED APPLICATIONS

This application is the National Phase of PCT/KR2014/001836 filed on Mar. 6, 2014, which claims priority under 35 U.S.C. 119(e) to U.S. Provisional Application No. 61/773,836 filed on Mar. 7, 2013 and U.S. Provisional Application No. 61/944,583 filed on Feb. 26, 2014, all of which are hereby expressly incorporated by reference into the present application.

TECHNICAL FIELD

The present invention relates to a wireless communication system, and more particularly, to a method of transmitting and receiving a signal related to D2D (device-to-device) communication.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE OF THE INVENTION

Technical Task

A technical task of the present invention is to define an operation of a user equipment receiving a signal from a user equipment performing D2D communication at the outside of cell coverage and an operation of the user equipment, which has received the signal.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to a first technical aspect of the present invention, a method of performing transmission and reception related to D2D (device-to-device) communication, which is performed by a first UE in a wireless communication system, can include the steps of stopping uplink transmission on a first band for a prescribed time period and searching for a signal transmitted by a second UE and if the signal transmitted by the second UE is searched, performing a report to a third UE. In this case, the report includes information on whether the second UE exists and information on a band on which the signal is received from the second UE.

To further achieve these and other advantages and in accordance with the purpose of the present invention, according to a second technical aspect of the present invention, a first UE performing transmission and reception related to D2D (device-to-device) communication in a wireless communication system includes a reception module and a processor, the processor configured to stop uplink transmission on a first band for a prescribed time period and search for a signal transmitted by a second UE, the processor, if the signal transmitted by the second UE is searched, configured to perform a report to a third UE. in this case, the report includes information on whether the second UE exists and information on a band on which the signal is received from the second UE.

The first technical aspect and the second technical aspect of the present invention can include followings.

The information on the band can include a request for restricting scheduling for the first UE on the band on which the signal is received from the second UE.

If the signal transmitted by the second UE is searched, the first UE can reduce uplink transmit power.

If the signal transmitted by the second UE is searched, a resource use of a boundary part among the first band can be restricted.

Searching for the signal transmitted by the second UE may be indicated by downlink control information received from the third UE.

The prescribed time period may correspond to a subframe appearing after 4 subframes from a subframe in which the downlink control information is received.

A reception confirmation response configured to be transmitted in the subframe corresponding to the prescribed time period can be bundled in a predetermined subframe.

The third UE may consider all reception confirmation responses configured to be transmitted in the subframe corresponding to the prescribed time period as ACK.

The signal transmitted by the second UE may correspond to one of a sounding reference signal, a random access preamble, a D2D synchronization signal and a discovery signal.

The report can include information on the count of hops of the signal transmitted by the second UE hopped from a synchronization cluster header located at the outside of coverage.

A parameter related to transmission of a sounding reference signal or a random access preamble can be shared between the first UE and the second UE by the third UE.

If the first UE corresponds to a UE in idle state, the search can be indicated by a paging signal.

The second UE may correspond to a UE operating on a second band corresponding to a band related to public safety.

The first band and the second band may be different from each other.

The signal transmitted by the second UE may correspond to an emergency signal.

Advantageous Effects

According to the present invention, efficiency of D2D communication can be enhanced in a manner of recognizing a device performing D2D communication at the outside of cell coverage and supporting an operation of a base station and a user equipment according to the device.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

The embodiments described below are constructed by combining elements and features of the present invention in a predetermined form. The elements or features may be considered optional unless explicitly mentioned otherwise. Each of the elements or features can be implemented without being combined with other elements. In addition, some elements and/or features may be combined to configure an embodiment of the present invention. The sequential order of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

That is, it is obvious that various operations performed to implement communication with the terminal over a network composed of multiple network nodes including a base station can be conducted by the base station or network nodes other than the base station. The term "base station (BS)" may be replaced with terms such as "fixed station," "Node-B," "eNode-B (eNB)," and "access point." The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)."

It should be noted that specific terms used in the description below are intended to provide better understanding of the present invention, and these specific terms may be changed to other forms within the technical spirit of the present invention.

In some cases, well-known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention can be supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. That is, steps or parts which are not described in the embodiments of the present invention so as not to obscure the technical spirit of the present invention may be supported by the above documents. All terms used herein may be supported by the aforementioned standard documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through radio technologies such as universal terrestrial radio access (UTRA) or CDMA2000. TDMA may be embodied through radio technologies such as global system for mobile communication (GSM)/general packet radio service (GPRS)/enhanced data rates for GSM evolution (EDGE). OFDMA may be embodied through radio technologies such as IEEE 802.11 (Wi-Fi), IEEE 802.16 (WiMAX), IEEE 802-20, and evolved UTRA (E-UTRA). UTRA is a part of the universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e standard (WirelessMAN-OFDMA reference system) and advanced IEEE 802.16m standard (WirelessMAN-OFDMA Advanced system). For clarity, the following description focuses on 3GPP LTE and 3GPP LTE-A systems. However, the spirit of the present invention is not limited thereto.

LTE/LTE-A Subframe Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports radio frame structure type 1 applicable to frequency division duplex (FDD) and radio frame structure type 2 applicable to time division duplex (TDD).

Figure 1:
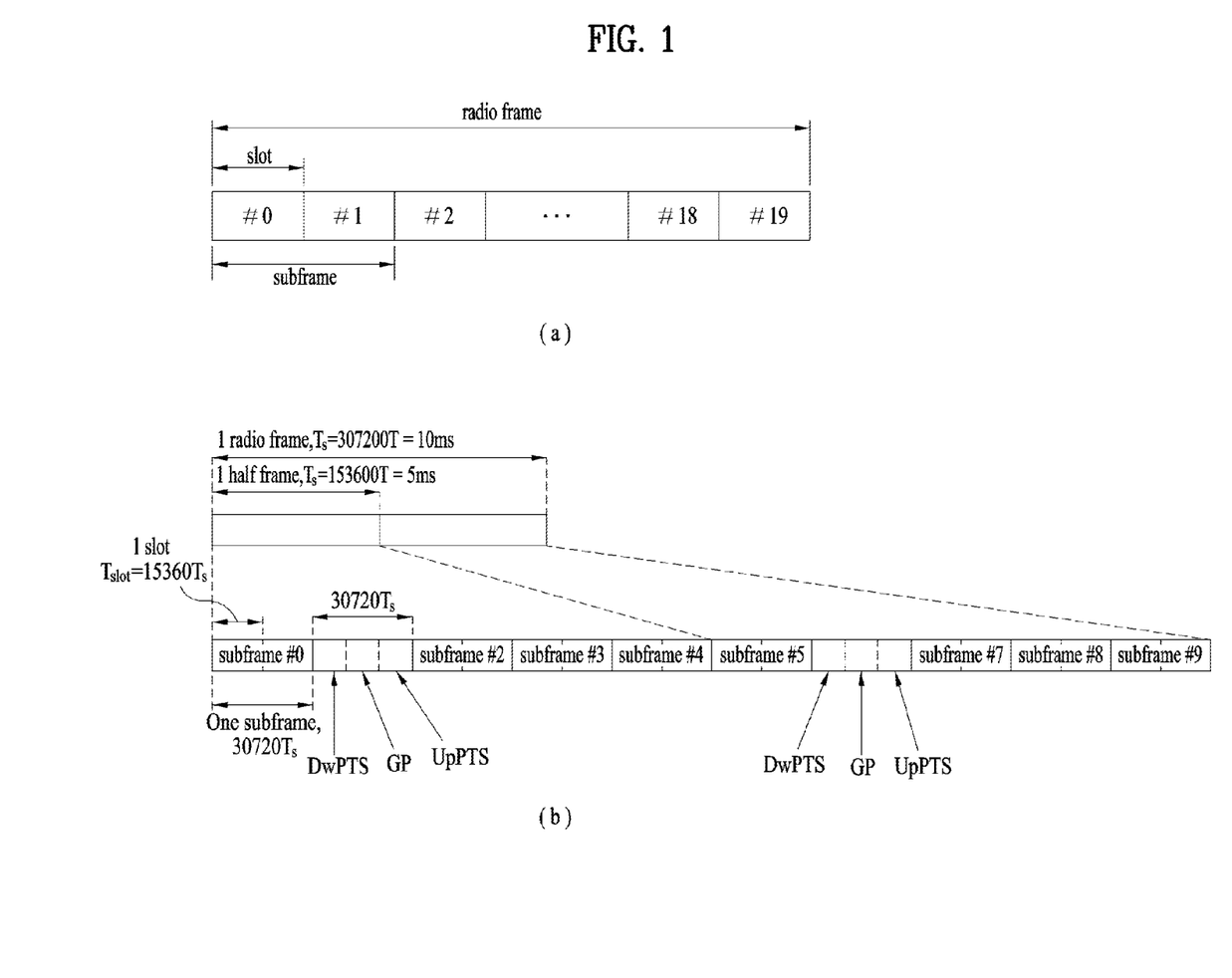
FIG. 1 is a diagram for a structure of a radio frame.

FIG. 1(a) illustrates radio frame structure type 1. A downlink radio frame is divided into 10 subframes. Each subframe includes two slots in the time domain. The duration of transmission of one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, each slot may include 7 OFDM symbols. For an extended CP configuring each OFDM symbol, the duration of each OFDM symbol is extended and thus the number of OFDM symbols included in a slot is smaller than in the case of the normal CP. For the extended CP, each slot may include, for example, 6 OFDM symbols. When a channel state is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other OFDM symbols may be allocated to a physical downlink shared channel (PDSCH).

FIG. 1(b) illustrates radio frame structure type 2. A type-2 radio frame includes two half frames, each of which has 5 subframes, downlink pilot time slots (DwPTSs), guard periods (GPs), and uplink pilot time slots (UpPTSs). Each subframe consists of two slots. The DwPTS is used for initial cell search, synchronization, or channel estimation in a UE, whereas the UpPTS is used for channel estimation in an eNB and UL transmission synchronization of a UE. The GP is provided to eliminate UL interference caused by multipath delay of a DL signal between DL and UL. Regardless of the types of radio frames, a subframe consists of two slots.

The illustrated radio frame structures are merely examples, and various modifications may be made to the number of subframes included in a radio frame, the number of slots included in a subframe, or the number of symbols included in a slot.

Figure 2:
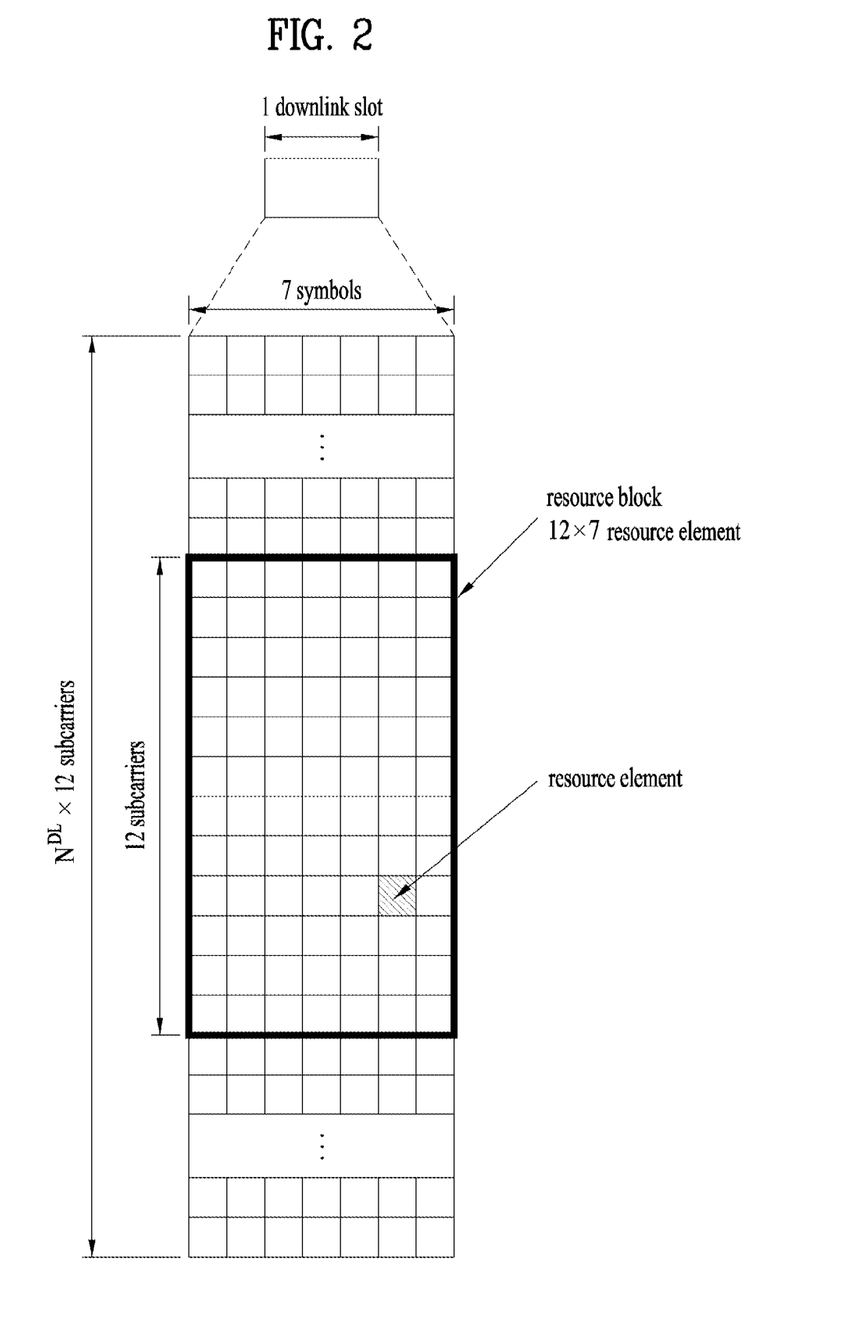
FIG. 2 is a diagram for a resource grid in downlink slot.

FIG. 2 is a diagram illustrating a resource grid of one DL slot. One DL slot includes 7 OFDM symbols in the time domain and an RB includes 12 subcarriers in the frequency domain. However, embodiments of the present invention are not limited thereto. For the normal CP, a slot may include 7 OFDM symbols. For the extended CP, a slot may include 6 OFDM symbols. Each element in the resource grid is referred to as a resource element (RE). An RB includes 12 7 REs. The number $N_{DL}$ of RBs included in a DL slot depends on a DL transmission bandwidth. A UL slot may have the same structure as the DL slot.

Figure 3:
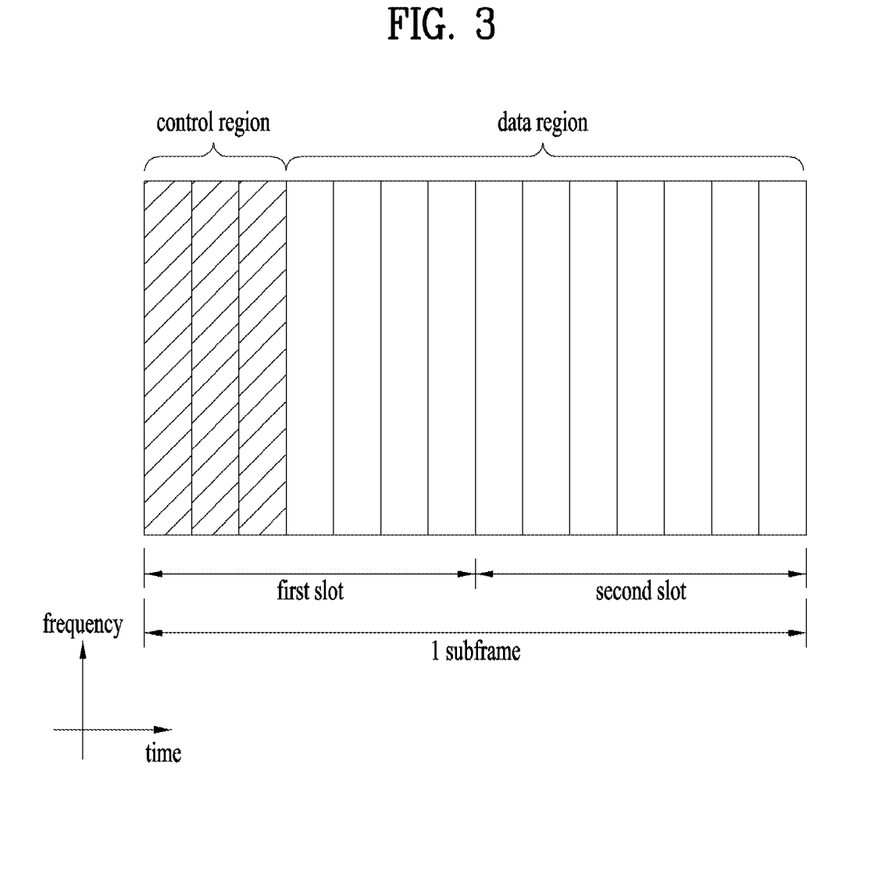
FIG. 3 is a diagram for a structure of a downlink subframe.

FIG. 3 illustrates a DL subframe structure. Up to three OFDM symbols in the leading part of the first slot in a DL subframe corresponds to a control region to which a control channel is allocated. The other OFDM symbols of the DL subframe correspond to a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or a UL transmit power control command for a UE group. The PDCCH may deliver information about the resource allocation and transport format of a DL shared channel (DL-SCH), resource allocation information of a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs in a UE group, transmit power control information, and voice over internet protocol (VoIP) activation information. A plurality of PDCCHs may be transmitted in the control region. A UE may monitor a plurality of PDCCHs. A PDCCH is transmitted in an aggregation of one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and the coding rate provided by the CCEs. An eNB determines the PDCCH format according to DCI transmitted to a UE and adds a cyclic redundancy check (CRC) to the control information. The CRC is masked with an identifier (ID) known as a radio network temporary identifier (RNTI) according to the owner or usage of the PDCCH. If the PDCCH is directed to a specific UE, its CRC may be masked with a cell-RNTI (C-RNTI) of the UE. If the PDCCH is for a paging message, the CRC of the PDCCH may be masked with a paging radio network temporary identifier (P-RNTI). If the PDCCH delivers system information (more specifically, a system information block (SIB)), the CRC may be masked with a system information ID and a system information RNTI (SI-RNTI). To indicate a random access response which is a response to a random access preamble transmitted by a UE, the CRC may be masked with a random access-RNTI (RA-RNTI).

Figure 4:
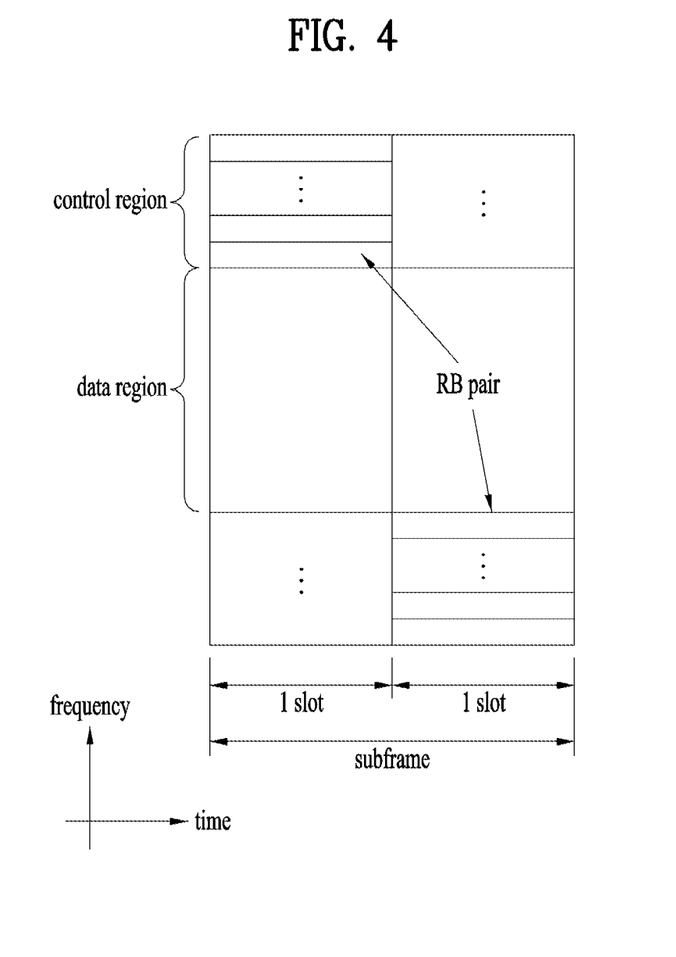
FIG. 4 is a diagram for a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region. A physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs from an RB pair occupy different subcarriers in two slots. This is called frequency hopping of the RB pair allocated to the PUCCH over a slot boundary.

Reference Signal (RS)

When a packet is transmitted in a wireless communication system, since the packet is transmitted via a radio channel, a signal may be distorted in the course of transmission. In order for a receiving end to correctly receive a distorted signal, it may be preferable that the distorted and received signal is corrected using channel information. In order to find out the channel information, a signal known to both of a transmitting end and the receiving end is transmitted and finds out the channel information with the extent of distortion when the signal is received on a channel. The signal is called a pilot signal or a reference signal.

When a data is transmitted/received using MIMO antenna, it may be preferable that a channel state between a transmitting antenna and a receiving antenna is detected in order for a receiving end to correctly receive the data. Hence, a separate reference signal should exist according to each transmitting antenna, specifically, each antenna port.

A reference signal can be classified into an uplink reference signal and a downlink reference signal. In a current LTE system, the uplink reference signal includes:

i) a DM-RS (demodulation-reference signal) for channel estimation to coherently demodulate information transmitted on PUSCH and PUCCH ii) an SRS (sounding reference signal) used for an eNode B to measure UL channel quality on a frequency of different network.

Meanwhile, the downlink reference signal includes:

i) a cell-specific reference signal (CRS) shared by all user equipments in a cell ii) a UE-specific reference signal used for a specific user equipment iii) a DM-RS (demodulation-reference signal) transmitted for coherent demodulation in case of transmitting PDSCH iv) a CSI-RS (channel state information-reference signal) used for delivering CSI (channel state information) in case of transmitting a downlink DMRS v) an MBSFN reference signal transmitted to coherently demodulate a signal transmitted in MBSFN (multimedia broadcast single frequency network) mode vi) a positioning reference signal used for estimating geographical location information of a user equipment.

A reference signal (RS) is mainly classified into two types in accordance with a purpose of the RS. One type of the RS is used to obtain channel information and another type of the RS is used to demodulate data. Since the former one is the RS to make a UE obtain DL channel information, it is transmitted in wideband. Although a UE does not receive DL data in a specific subframe, the UE should receive and measure the corresponding RS. This sort of RS can also be used for performing a measurement for a handover and the like. In case that a base station transmits a resource in DL, the latter one corresponds to an RS transmitted together with the resource. A UE can perform channel estimation by receiving the RS and may be then able to demodulate data. This sort of RS should be transmitted to a region to which the data is transmitted.

A CRS is used for two purposes including channel information acquisition and data demodulation. On the contrary, a UE-specific reference signal is used for a purpose of data demodulation only. The CRS is transmitted in every subframe for a wideband. The CRS for maximum 4 antenna ports can be transmitted according to the number of transmitting antennas of a base station.

For instance, if the number of antenna ports of the base station corresponds to 2, a CRS for $0^{th}$ antenna port and a CRS for $1^{st}$ antenna port are transmitted. If the number of antenna ports of the base station corresponds to 4, CRSs for 0 to $3^{rd}$ antenna port are transmitted, respectively.

Figure 5:
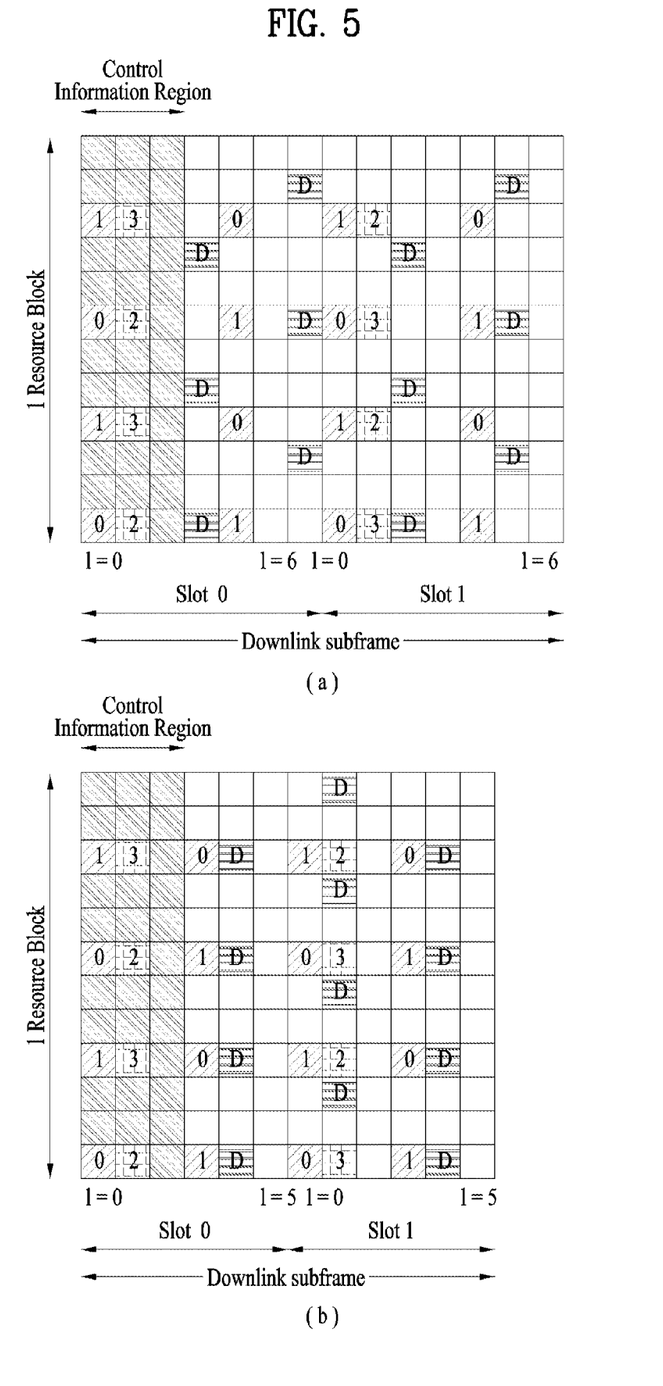
FIG. 5 is a diagram for explaining a reference signal.

FIG. 5 is a diagram for patterns that a CRS and a DRS defined by a legacy 3GPP LTE system (e.g., release-9) are mapped to a downlink resource block (RB) pair. The downlink RB pair as a reference signal mapping unit can be represented by a unit of 'one subframe in time domain×12 subcarriers on frequency domain' In particular, one RB pair has a length of 14 OFDM symbols in case of a normal CP (FIG. 5 (a)) and a length of 12 OFDM symbols in case of an extended CP (FIG. 5 (b)) in time domain.

FIG. 5 shows a position of a reference signal on RB pairs in a system where a base station supports 4 transmission antennas. In FIG. 5, resource elements (RE) represented as '0', '1', '2', and '3' indicate a position of the CRS for an antenna port 0, 1, 2, and 3, respectively. Meanwhile, a resource element represented as 'D' in FIG. 5 indicates a position of a DM-RS.

Figure 6:
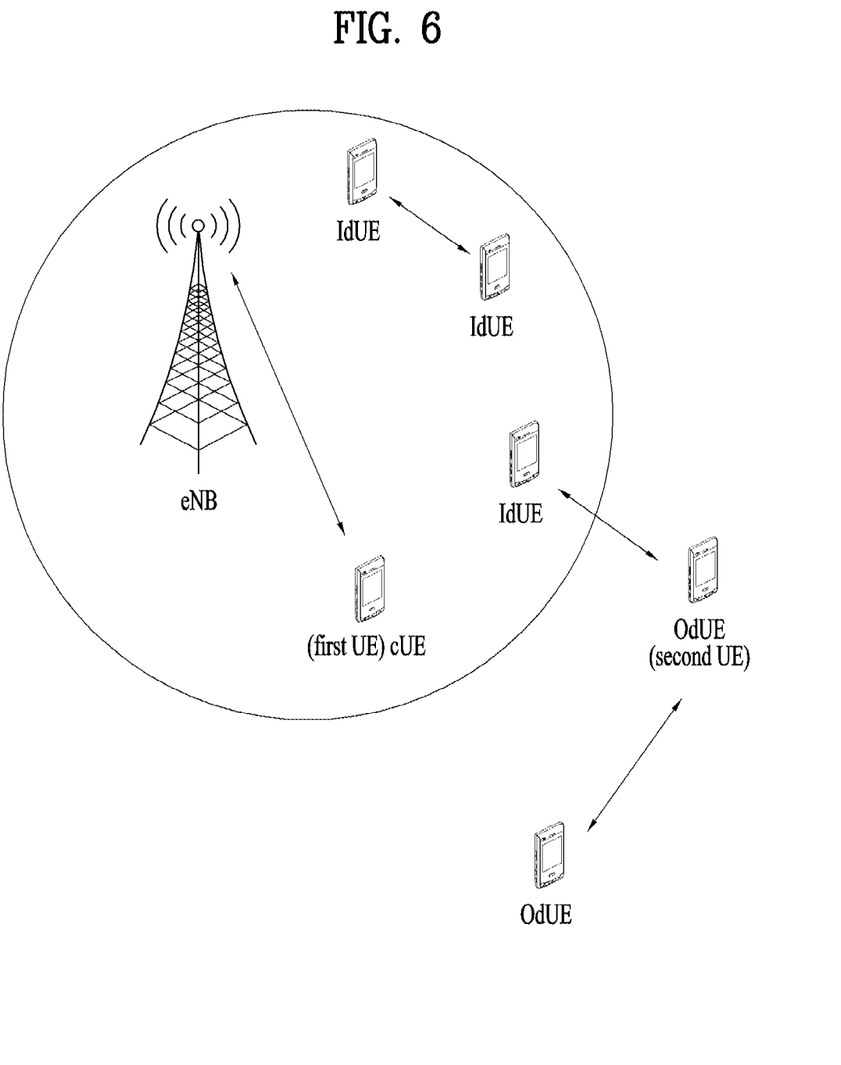
FIG. 6 is a diagram for network environment to which embodiment of the present invention is applicable.

In the following, as shown in FIG. 6, when user equipments are mixed at the inside and the outside of cell coverage, a method of transmitting and receiving a signal of a user equipment located at the inside of the coverage (in particular, at the cell boundary) is explained based on what is mentioned in the foregoing description. In FIG. 6, a cUE corresponds to a UE (in one of RRC connection mode or idle mode) communicating with an eNB, an IdUE corresponds to a UE located at the inside of coverage of the eNB among UEs performing D2D communication and OdUE corresponds to a UE located at the outside of the coverage of the eNB among the UEs performing D2D communication. In this case, the OdUE may correspond to a UE belonging to an eNB different from the eNB (in this case, the ODUE and the cUE are respectively associated with cells different from each other) or a UE not connected with a network since there is no eNB around the UE. In the following, the cUE and the OdUE are called a first UE and a second UE, respectively. And, the eNB can be called a third UE. In this case, the third UE may correspond to an eNB, a synchronization cluster header UE, a normal D2D UE and the like.

In the present invention, an operation of a UE, which is located at a cell boundary within coverage, performed to deliver a message of a UE located at the outside of the cell boundary is explained. In order to find out a UE located at the cell boundary, it may be able to use RSRP or TA (timing advance) value reported from UEs. If a value reported from a UE is equal to or greater than a specific threshold (e.g., TA) or is equal to or less than a specific threshold (e.g., RSRP), it may be able to determine it as the UE corresponds to the UE located at the cell boundary. Or, it may be able to evaluate PDCCH detection capability of a UE. if an error probability of the UE is equal to or greater than a specific threshold, it may be able to determine it as the UE corresponds to the UE located at the cell boundary. In this case, the threshold for the error probability may be lower than a threshold used for RLF (radio link failure). An eNB can indicate the UE located at the cell boundary to perform a specific operation based on a value (e.g., RSRp, etc.) reported from a UE. Or, a UE autonomously determines as the UE is located at the cell boundary and may be able to perform a specific operation. In this case, the UE can inform an eNB that the UE performs the specific operation. And, an operation (e.g., a SF or a period for searching for a signal of a dUE) performed by a UE can be promised in advance between an eNB and the UE. In case of an RRC idle UE, since it is difficult to know a TA value, in this case, it may be able to estimate a UE located at a cell boundary using a TA value of a previous connected mode. As a different example, measurement of RSRp, the number of decoding failure of contiguous PDCCH, error probability, etc. can be used for determining a cell edge UE. Or, in case of the RRC idle UE, a specific UE designated by an eNB in advance or a randomly determined UE is determined as the cell edge UE and the eNB can indicate the UE to perform a specific operation.

A UE (or a UE indicated to search for a signal of an OdUE although the UE is not located at the cell boundary) determined as a UE located at a cell boundary using the aforementioned method can perform an operation of searching for a specific signal transmitted from the OdUE for a prescribed period. In this case, the signal transmitted by the OdUE may correspond to a discovery signal or such a form as a beacon signal for D2D (e.g., D2D synchronization signal, reference signal). Or, a legacy signal form can be reused for the signal transmitted by the OdUE. A dUE located at the outside of a cell can transmit a signal of a specific format in a DL resource or a UL resource of a cellular network. This can be considered in a manner of dividing into a TDD case and a FDD case. Or, if a cUE and an OdUE use bands different from each other, a signal search can be performed on a band (e.g., a public safety band (PS>> used by the OdUE. Basically, since a UE located at the outside of a cell is unable to transceive DL and UL with an eNB, it may be able to assume that the UE is not aware of an SF boundary. Hence, in order for a UE located at the inside of a cell to receive a message from the UE located at the outside of the cell, the UE stops transmitting or receiving data to/from an eNS for prescribed time and searches for a signal. Or, the UE may be able to perform an operation of searching for a signal of a specific format transmitted by a dUE while transmitting or receiving data to/from the eNB. If a band used by a cUE and a band used by a dUE are different from each other, both bands can be received at the same time or one of the two bands can be selectively received depending on capability of a UE. As an example, if it is assumed that the dUE operates on a PS band, the cUE terminates communication with the eNS (halfduplex UE) and may be able to perform a signal search on the PS band.

The following description is explained by two cases including a case that the first UE and the second UE are operating on an identical frequency band and a case that the first UE and the second UE are operating on frequency band different from each other. In case that the first and the second UE are operating on an identical first (frequency) band, the first (frequency) band may correspond to a band for commercial (or a band for public safety). Hence, both the first UE and the second UE may correspond to a commercial UE (or a public safety UE). And, in this case, the first band may correspond to a band including both an uplink transmission band and a downlink transmission band. In case that the first and the second UE are respectively operating on a first (frequency) band and a second (frequency) band different from each other, the first frequency band and the second frequency band may correspond to a band for commercial and a band for public safety, respectively (of course, the first frequency band and the second frequency band may correspond to a band for public safety and a band for commercial, respectively).

Embodiment 1

First embodiment relates to a case that the first UE and the second UE are operating on an identical band (first band). The first UE searches for a signal transmitted by the second UE on the first band. If the signal transmitted by the second UE is searched, the first UE can perform a report on the signal to the third UE. In this case, a method of transmitting and receiving a signal and operations of UEs may vary according to whether it is TDD or FDD. In case of the FDD, the method and the operations of the UEs may vary according to whether the first UE searches for the signal transmitted by the second UE on an uplink band or a downlink band. In the following, each of the aforementioned cases is described.

Embodiment 1-1: Searching for a Signal Transmitted from Second UE on Uplink Band The first UE stops uplink transmission on the first band for a prescribed time interval (This is because, if a reception circuit is shared in D2D and cellular communication, it is impossible to receive a signal at the same time) and may be able to search for a signal (e.g., a discovery signal, a beacon signal, a D2D synchronization signal, a reference signal) transmitted by the second UE. In this case, the signal transmitted by the second UE can be searched by an implicit or explicit indication of an eNB. For example, the eNB can indicate the first UE to search for a signal via RRC signaling, MAC control element, physical layer signaling and the like. Specifically, searching for the signal transmitted by the second UE can be indicated by DCI. In this case, the first UE omits uplink transmission in a subframe n+4, which is appearing after 4 subframes from a subframe n in which the DCI is received, and may be able to search for the signal of the second UE. If the first UE corresponds to a UE in idle mode, the search can be indicated by a paging signal. The prescribed time interval may correspond to at least one or more slots or subframes. Or, the prescribed time interval may correspond predetermined time.

The signal transmitted by the second UE may correspond to an uplink signal itself defined by legacy LTE/LTE-A or a signal of a modified form. For instance, the signal transmitted by the second UE may correspond to a RACH (random access channel) of a specific ID (promised in advance between the first UE and the second UE) or an SRS. In this case, a parameter related to transmission of an SRS or a RACH signal (random access preamble) can be shared between the first UE and the second UE (by an eNB). For example, in case of the SRS, all or a part of an SRS parameter (SRS comb type, SRS bandwidth, frequency domain position, SRS hopping bandwidth, duration, SRS configuration index, SRS cyclic shift) can be signaled to the first UE and the second UE in advance. In case of the RACH, all or a part of a RACH parameter (e.g., a preamble format, a preamble ID, etc.) can be signaled to the first UE and the second UE in advance. The SRS and the RACH can be transmitted using a frequency band defined by legacy LTE/LTE-A or a band greater/less than the frequency band. For example, the RACH can be transmitted by the number of RBs greater or less than 6 RBs. If the RACH is transmitted by the number of RBs less than 6 RBs, it may be able to reduce interference affecting a neighboring RB. If the RACH is transmitted by the number of RBs greater than 6 RBs, it may be able to have a merit in that detection probability is high. Or, the first UE can search for a D2D synchronization signal, a reference signal (DM-RS), a discovery signal and the like of the second UE. In this case, a sequence ID of a specific signal (a synchronization signal or a reference signal) used by the second UE may correspond to an ID signaled in advance or an ID designated by a network operator for the second UE.

Since the first UE stops uplink transmission for a prescribed time interval to receive a signal transmitted from the second UE, a reception confirmation response (ACK/NAK/DTX), which is not transmitted in the uplink transmission, can be transmitted in a different specific subframe. Or, bundling or channel selection can be performed for the reception confirmation response in a different specific subframe. In this case, the channel selection can be performed in a table greater than a channel selection table as many as the number of reception confirmation responses to be transmitted in a manner of adding an A value (numbers of CCs) to the table. Or, an eNB may consider all reception confirmation responses not transmitted in a prescribed time interval as ACK/NAK.

Subsequently, having detected the signal transmitted by the second UE, the first UE can perform a report to an eNB or neighboring UEs. In this case, the report may include information on whether the second UE exists and information on a band on which the signal transmitted from the second UE is received. In this case, the information on the band can include information on a band on which a signal transmitted from the second UE is actually received and a request for restricting scheduling for the first UE (a request for not scheduling on a band which is recognized as a band of strong interference among bands on which the signal transmitted from the second UE is received). And, the report can include average of measured power of a signal, an index of an RB of which distribution or reception power exceeds a specific threshold value, etc. If a plurality of signals of the second UE are examined, reporting can be performed in a manner of being separated (for each of a plurality of the signals). In this case, the signal of the second UE may correspond to a D2D synchronization signal (D2DSS) or a discovery signal transmitted by the second UE. In this case, information reported to a network can include all or a part of information on an ID of the D2DSS, reception measurement value of the D2DSS and information on the count of hops of the D2DSS hopped from a synchronization cluster header located at the outside of coverage. After the signal of the second UE is detected, measurement of RLM/RRM/CSI can be separately performed in a partial radio frame or may not be included in a previous measurement result. This sort of operation can be performed in the n number of subframes/frames after the first UE detects the signal of the second UE.

As a different example, if the first UE discovers/detects a signal transmitted from the second UE, it may be able to configure the first UE to transmit a specific signal. For instance, if the first UE detects a specific signal (from the second UE), the first UE can transmit a D2DSS or a discovery signal after prescribed time elapses. In this case, the D2DSS or the discovery signal can be transmitted to inform a neighboring UE that the first UE has discovered the second UE. And, the D2DSS or the discovery signal can be transmitted to inform the second UE of existence of the first UE existing in the vicinity of the second UE. At the same time, the D2DSS or the discovery signal can be transmitted to the second UE to ask the second UE to match synchronization with the D2DSS or the discovery signal.

Having received the report from the first UE, the third UE can configure/indicate all or a part of UEs or a specific UE to operate as a 'Network-to/from-out coverage UE relay' relaying a signal of an eNB based on the report received from the first UE.

Embodiment 1-2: Searching for a Signal Transmitted from Second UE on Downlink Band Embodiment 1-2 corresponds to a case that the second UE transmits a signal on a downlink band. Contents not separately mentioned in the following description can be replaced with the aforementioned embodiment 1-1. The first UE can receive a signal transmitted by the second UE in a manner of emptying out a specific resource (subframe or radio frame unit) or together with a different signal. For instance, the first UE can search for the signal of the second UE while receiving PDSCH. In this case, a level of MCS of the PDSCH may be identical or lower than a level of MCS fed back by the first UE.

When the first UE receives a signal transmitted by the second UE, the first UE may not be able to properly receive a reception confirmation response for uplink transmission due to interference from the second UE. Hence, PHICH can be transmitted in a subframe different from a subframe in which the signal of the second UE is received. Or, bundling (logical and operation) can be performed on the PHICH with ACK/NACK of a different subframe. Or, a UE can consider a reception confirmation response in the corresponding subframe as ACK or NACK all the time.

The signal transmitted by the second UE may correspond to a downlink signal itself defined by legacy LTE/LTE-A or a signal of a modified form. Or, the signal transmitted by the second UE may correspond to a sequence of a specific format of a predetermined pattern. In this case, the sequence of the specific format should be commonly known to the first UE and the second UE. As a concrete example of the signal transmitted by the second UE, a CRS of a specific ID, a PSS (primary synchronous signal)/an SSS (secondary synchronous signal) can be used. A specific ID used by the second UE may correspond to an ID signaled in advance or an ID designated by a network operator for the second UE.

Having discovered the signal transmitted by the second UE, the first UE can perform a report to an eNB or neighboring UEs. In this case, the report can include average of measured power of a signal, an index of an RB of which distribution or reception power exceeds a specific threshold value, etc. If a plurality of signals of the second UE are examined, reporting can be performed in a manner of being separated (for each of a plurality of the signals). In this case, the signal of the second UE may correspond to a D2D synchronization signal (D2DSS) or a discovery signal transmitted by the second UE. In this case, information reported to a network can include all or a part of information on an ID of the D2DSS, reception measurement value of the D2DSS and information on the count of hops of the D2DSS hopped from a synchronization cluster header located at the outside of coverage. After the signal of the second UE is detected, measurement of RLM/RRM/CSI can be separately performed in a partial radio frame or may not be included in a previous measurement result. This sort of operation can be performed in the n number of subframes/frames after the first UE detects the signal of the second UE.

As a different example, if the first UE discovers/detects a signal transmitted from the second UE, it may be able to configure the first UE to transmit a specific signal. For instance, if the first UE detects a specific signal (from the second UE), the first UE can transmit a D2DSS or a discovery signal after prescribed time elapses. In this case, the D2DSS or the discovery signal can be transmitted to inform a neighboring UE that the first UE has discovered the second UE. And, the D2DSS or the discovery signal can be transmitted to inform the second UE of existence of the first UE existing in the vicinity of the second UE. At the same time, the D2DSS or the discovery signal can be transmitted to the second UE to ask the second UE to match synchronization with the D2DSS or the discovery signal.

Having received the report from the first UE, the third UE can configure/indicate all or a part of UEs or a specific UE to operate as a 'Network-to/from-out coverage UE relay' relaying a signal of an eNB based on the report received from the first UE.

Embodiment 1-3: TDD

In case of TDD, the first UE can search for a signal of the second UE for a prescribed period irrespective of whether a subframe corresponds to a UL subframe or a DL subframe. This is because, since there is a possibility of dislocation between a subframe boundary of the first UE and a subframe boundary of the second UE in TDD, it is considered that UL/DL resource distinction is meaningless. The aforementioned signal search of the first UE can be indicated by an eNB or can be determined in advance.

As mentioned earlier in the foregoing embodiment, a reception confirmation response which is received and transmitted in a subframe in which the signal transmitted from the second UE is detected can be transmitted in a different subframe. Or, bundling or channel selection can be performed in a different subframe for the reception confirmation response.

If there is a big difference between a subframe boundary of the first UE and a subframe boundary of the second UE, the signal from the second UE can be received in a subframe not expected by the first UE. Hence, the second UE searches for an uplink signal (e.g., a RACH, an SRS, etc.) of the first UE, infers downlink subframe transmission timing from the first UE based on timing on which the uplink signal is received and may be able to transmit PSS/SSS or CRS/CSI-RS.

If the signal transmitted by the second UE is discovered, the first UE can perform a report to an eNB or neighboring UEs. In this case, the report can include average of measured power of a signal, an index of an RB of which distribution or reception power exceeds a specific threshold value, etc. If a plurality of signals of the second UE are examined, reporting can be performed in a manner of being separated (for each of a plurality of the signals). In this case, the signal of the second UE may correspond to a D2D synchronization signal (D2DSS) or a discovery signal transmitted by the second UE. In this case, information reported to a network can include all or a part of information on an ID of the D2DSS, reception measurement value of the D2DSS and information on the count of hops of the D2DSS hopped from a synchronization cluster header located at the outside of coverage. After the signal of the second UE is detected, measurement of RLM/RRM/CSI can be separately performed in a partial radio frame or may not be included in a previous measurement result. This sort of operation can be performed in the n number of subframes/frames after the first UE detects the signal of the second UE.

In the foregoing embodiments, a subframe boundary of the first UE and a subframe boundary of the second UE are independent of each other. A subframe boundary of the signal transmitted by the second UE can be revised in some extent by a signal transmitted by the first UE. For instance, it may assume that timing of receiving a RACH, an SRS, etc. transmitted by the first UE in uplink corresponds to the subframe boundary of the first UE. The first UE can periodically detect a signal of a specific format of the second UE and update timing in a broadcast form.

As a different example, if the first UE discovers/detects a signal transmitted from the second UE, it may be able to configure the first UE to transmit a specific signal. For instance, if the first UE detects a specific signal (from the second UE), the first UE can transmit a D2DSS or a discovery signal after prescribed time elapses. In this case, the D2DSS or the discovery signal can be transmitted to inform a neighboring UE that the first UE has discovered the second UE. And, the D2DSS or the discovery signal can be transmitted to inform the second UE of existence of the first UE existing in the vicinity of the second UE. At the same time, the D2DSS or the discovery signal can be transmitted to the second UE to ask the second UE to match synchronization with the D2DSS or the discovery signal.

Having received the report from the first UE, the third UE can configure/indicate all or a part of UEs or a specific UE to operate as a 'Network-to/from-out coverage UE relay' relaying a signal of an eNB based on the report received from the first UE.

Embodiment 2

Second embodiment relates to a case that the first UE and the second UE are operating on frequency bands different from each other. Since frequency bands are different from each other, the first UE can search for a signal of the second UE without any restriction. As mentioned in the foregoing description, a first frequency band on which the first UE operates may correspond to a band for commercial and a second frequency band on which the second UE operates may correspond to a band for public safety (vice versa). In this case, the first UE and the second UE can be called a commercial UE and a public safety UE, respectively. Or, the first UE and the second UE may belong to a macro cell and a small cell, respectively, operating on frequency bands different from each other.

A signal transmitted by the second UE may correspond to an emergency signal. Since the frequency band on which the first UE operates and the frequency band on which the second UE operates are different from each other, signal transmission of the second UE and a search of the first UE can be performed in two aspects described in the following.

First of all, the second UE transmits an emergency signal on a first band corresponding to an operation frequency band of the first UE and the first UE searches for the emergency signal. In this case, for concrete contents related to the signal search of the first UE, it may apply the aforementioned embodiment 1.

Secondly, the second UE transmits an emergency signal on a second band corresponding to an operation frequency band of the second UE and the first UE performs searching for a signal transmitted from the second UE on the second band. In this case, the first UE can search for the signal transmitted from the second UE while stopping transceiving a signal with an eNB according to capability of the first UE. Or, the first UE can transceive a signal with the eNB on the first band and may be able to search for the emergency signal on the second band.

If the first UE detects the signal transmitted from the second UE, the first UE can reduce uplink transmit power. In this case, if the first band and the second band are adjacent to each other, interference is reduced and the second band can be protected. In the same manner, if the signal of the second UE is detected, a resource use of a boundary part of the first band can be restricted. For example, in case of transmitting PUCCH, the transmission of PUCCH can be performed in a manner of being shifted to a center part of the first band.

Meanwhile, if the first UE is able to access a single frequency band only, the first UE should stop transceiving a signal with an eNB to search for a signal transmitted from the second UE. In this case, similar to inter-band RRM measurement, additional searching time is requested by the first UE and the first UE can perform an operation of searching for the signal transmitted from the second UE in a predefined DRX/UL subframe. In case of TDD, since it is impossible to transmit and receive a signal on the first band during a signal search period of the second UE, the first UE does not perform RLM, RRM, and CSI measurement in the corresponding region. The DRX/DTX period can be promised in advance between an eNB and the first UE or can be signaled to the first UE.

Device Configuration According to Embodiment of the Present Invention

Figure 7:
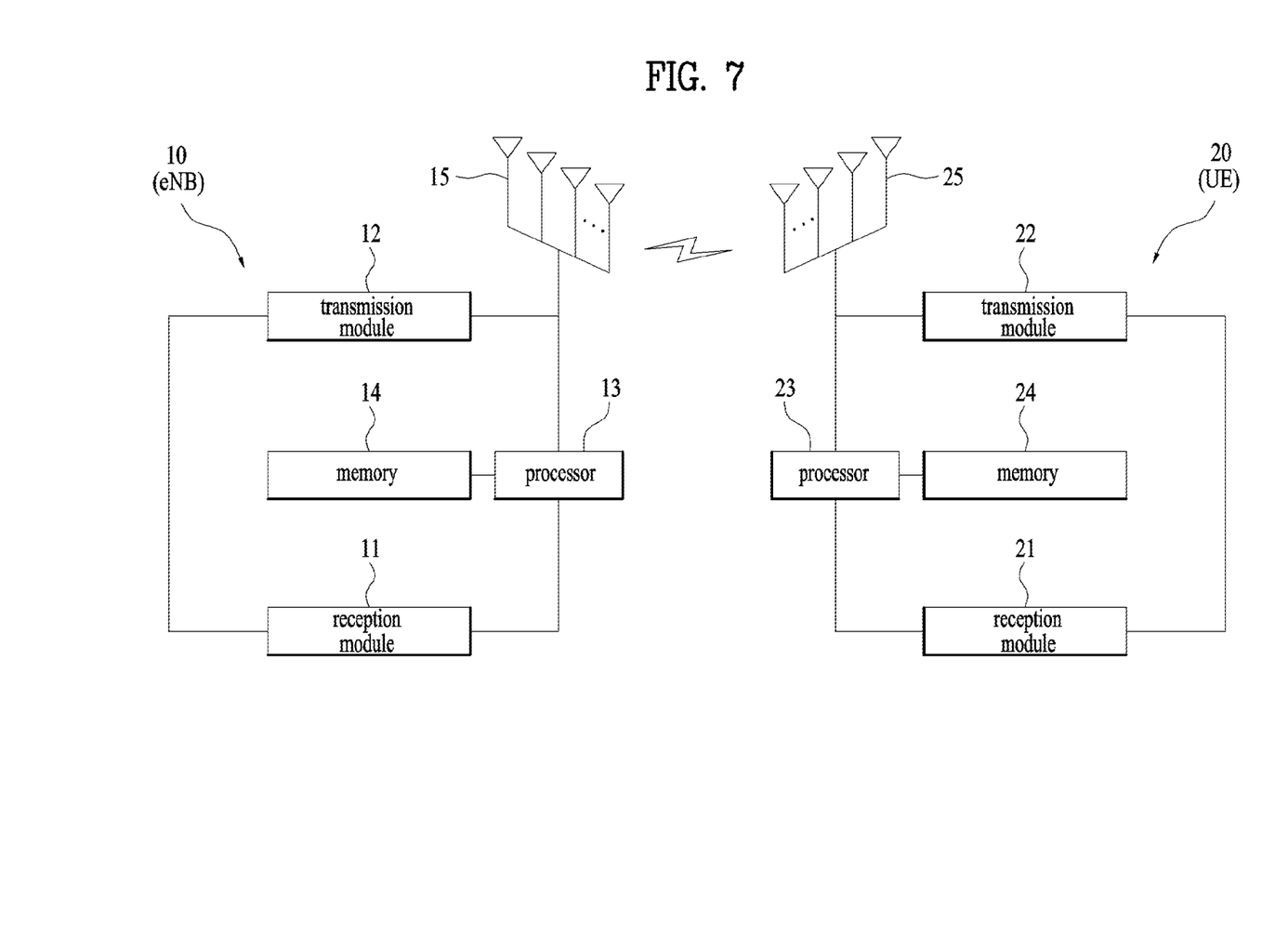
FIG. 7 is a diagram for configuration of a transceiver.

FIG. 7 is a diagram for configuration of a transceiver.

Referring to FIG. 7, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 7, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 7 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A method of performing transmission and reception related to device-to-device (D2D) communication, which is performed by a first user equipment (UE) in a wireless communication system, the method comprising:
   determining, by the first UE, whether or not the first UE locates at a cell boundary within coverage of a base station;
   stopping, by the first UE, uplink transmission to the base station on a first frequency band for a prescribed time period and searching, by the first UE, for a signal transmitted from a second UE during the prescribed time period, when the first UE determines that the first UE locates at the cell boundary within coverage of the base station;

if the signal transmitted from the second UE during the prescribed time period is searched by the first UE, performing, by the first UE, a report to the base station, wherein the report comprises information on whether the second UE is proximate to the first UE; and when there is acknowledgement information that should be transmitted in a first subframe included in the prescribed time period in response to a signal transmitted from the base station, but the acknowledgement information cannot be transmitted from the first UE to the base station in the first subframe, transmitting, by the first UE, the acknowledgement information to the base station in a second subframe that is not included in the prescribed time period.

2. The method of claim 1, wherein if the signal transmitted from the second UE is searched, the first UE reduces uplink transmit power.

3. The method of claim 1, wherein if the signal transmitted from the second UE is searched, a resource use of a boundary part among the first frequency band is restricted.

4. The method of claim 1, wherein searching for the signal transmitted from the second UE is indicated by downlink control information received from the base station.

5. The method of claim 4, wherein the first subframe appears after 4 subframes from a subframe in which the downlink control information is received.

6. The method of claim 1, wherein the acknowledgement information configured to be transmitted in the first subframe corresponding to the prescribed time period is bundled in the second subframe.

7. The method of claim 1, wherein the signal transmitted by the second UE corresponds to one of a sounding reference signal, a random access preamble, a D2D synchronization signal and a discovery signal.

8. The method of claim 7, wherein a parameter related to transmission of a sounding reference signal or a random access preamble is shared between the first UE and the second UE by the base station.

9. The method of claim 1, wherein the report comprises information on a count of hops of the signal transmitted by the second UE hopped from a synchronization cluster header located outside of coverage of the base station.

10. The method of claim 1, wherein if the first UE corresponds to a UE in idle state, the search is indicated by a paging signal.

11. The method of claim 10, wherein the signal transmitted by the second UE corresponds to an emergency signal.

12. The method of claim 1, wherein the second UE corresponds to a UE operating on a second frequency band corresponding to a frequency band related to public safety.

13. The method of claim 12, wherein the first frequency band and the second frequency band are different from each other.

14. A first user equipment (UE) for performing transmission and reception related to device-to-device (D2D) communication in a wireless communication system, the first UE comprising:

a transmission module;
a reception module; and
a processor operably coupled with the transmission module and the reception module,
wherein the processor is configured to:
determine whether or not the first UE locates at a cell boundary within coverage of a base station,
stop uplink transmission to the base station on a first frequency band for a prescribed time period and search for a signal transmitted from a second UE, when the first UE locates at the cell boundary within coverage of the base station,
if the signal transmitted from the second UE during the prescribed time period is searched by the processor, perform a report to the base station,
wherein the report comprises information on whether the second UE is proximate to the first UE, and
when there is acknowledgement information that should be transmitted in a first subframe included in the prescribed time period in response to a signal transmitted from the base station, but the acknowledgement information cannot be transmitted from the first UE to the base station in the first subframe, control the transmission module to transmit the acknowledgement information in a second subframe that is not included in the prescribed time period.

* * * * *